(12) United States Patent
Norton

(10) Patent No.: US 6,224,450 B1
(45) Date of Patent: May 1, 2001

(54) CYCLING ACTIVITY BELT

(76) Inventor: Laurie J. Norton, 1074 Twinbridge Ct., Brentwood, CA (US) 94513

( * ) Notice: Subject to any disclaimer, the term of this patent is extended or adjusted under 35 U.S.C. 154(b) by 0 days.

(21) Appl. No.: 09/377,101

(22) Filed: Aug. 19, 1999

Related U.S. Application Data

(60) Provisional application No. 60/098,283, filed on Aug. 28, 1998.

(51) Int. Cl.$^7$ ..................................................... A63H 33/00
(52) U.S. Cl. ............................................... 446/28; 446/26
(58) Field of Search .............................. 446/26, 28, 227, 446/446, 486

(56) References Cited

U.S. PATENT DOCUMENTS

| | | | |
|---|---|---|---|
| D. 282,761 | * | 2/1986 | Kino ........................................ D21/64 |
| 3,859,886 | * | 1/1975 | Brisco, Sr. ............................. 84/402 |
| 4,540,219 | | 9/1985 | Klinger ................................ 297/487 |
| 4,545,768 | * | 10/1985 | Hinnen .................................. 434/304 |
| 4,874,340 | * | 10/1989 | Smallwood ............................ 446/28 |
| 5,465,888 | * | 11/1995 | Owens .................................. 224/680 |
| 5,477,998 | * | 12/1995 | Reckler ................................. 224/586 |
| 5,484,316 | * | 1/1996 | Poirier .................................... 446/28 |
| 5,560,046 | * | 10/1996 | Iwamasa et al. ........................ 2/328 |
| 5,575,044 | * | 11/1996 | Zornes .................................... 24/168 |
| 5,702,039 | * | 12/1997 | Olaiz ..................................... 224/409 |
| 5,730,340 | | 3/1998 | Bosic .................................... 224/250 |
| 5,797,823 | * | 8/1998 | Gouvis, II ............................ 482/105 |
| 5,879,076 | * | 3/1999 | Cross .................................... 362/555 |
| 5,950,888 | * | 9/1999 | Nolan-Brown ....................... 224/172 |

* cited by examiner

Primary Examiner—Jacob K. Ackun, Jr.
Assistant Examiner—F. Francis
(74) Attorney, Agent, or Firm—Richard C. Litman

(57) ABSTRACT

An activity belt to be worn by a cyclist has amusement devices attached. The amusement devices entertain a child riding in a child carrier seat behind the cyclist. The amusement devices may attach with clips so they can be changed to suit the age and interests of the child. The activity belt provides back support for the cyclist and a pocket for storing small items while cycling.

10 Claims, 5 Drawing Sheets

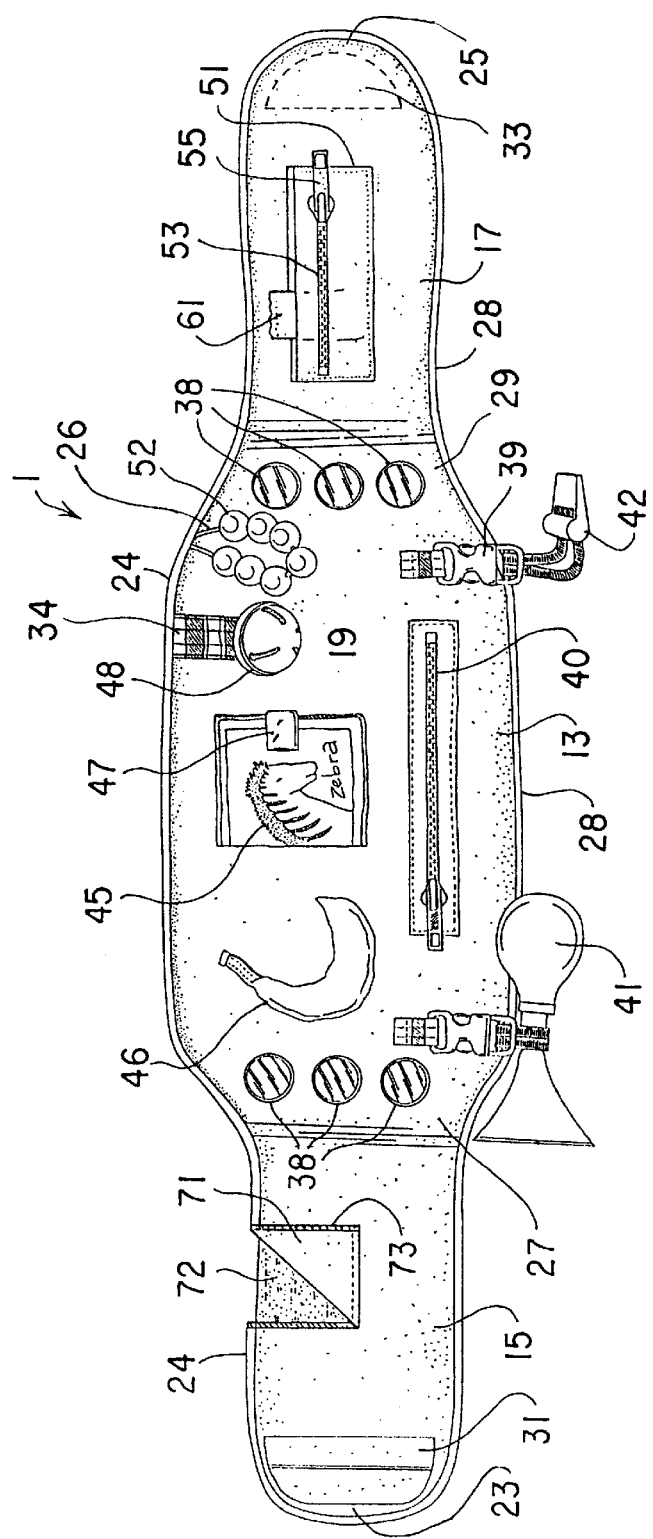
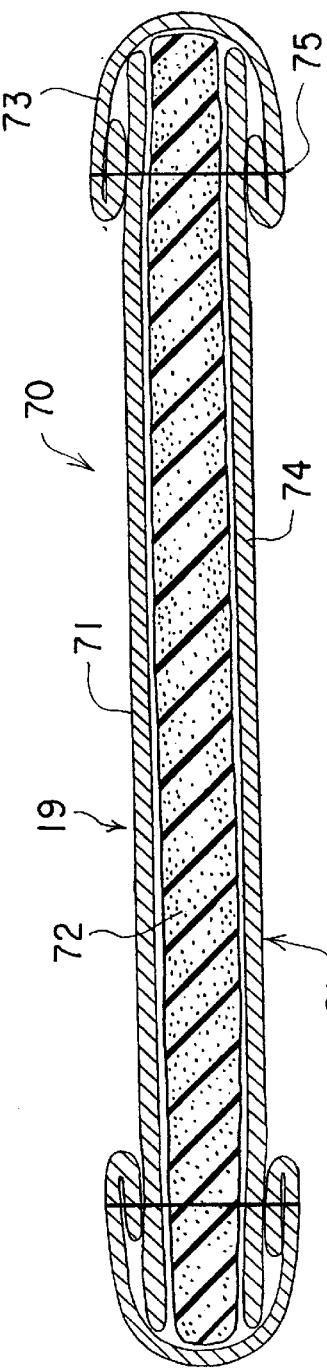
FIG. 3
FIG. 7

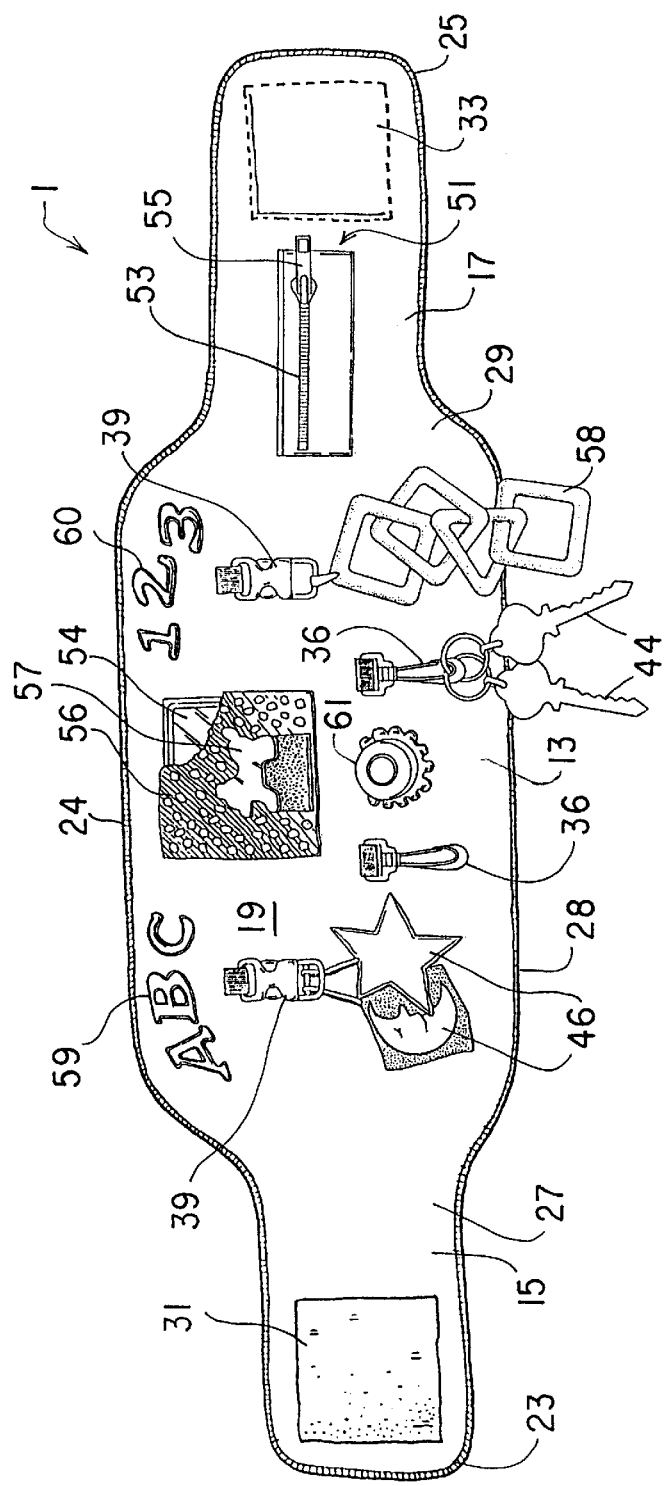
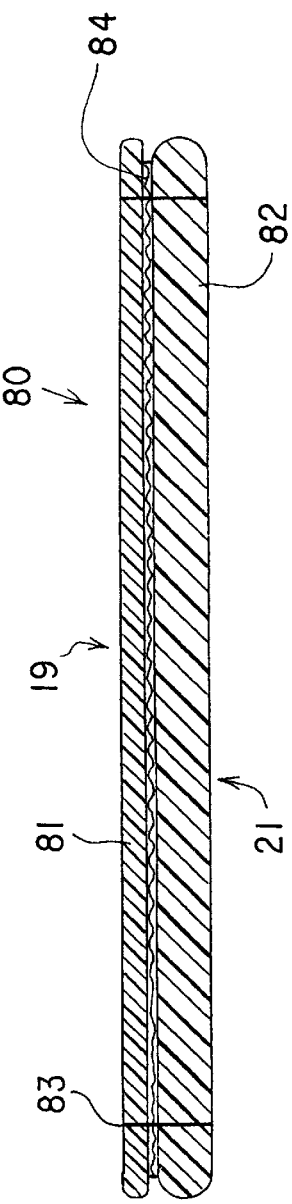

CYCLING ACTIVITY BELT

CROSS-REFERENCE TO RELATED APPLICATION

This application claims the benefit of U.S. Provisional Patent Application Serial No. 60/098,283, filed Aug. 28, 1998.

BACKGROUND OF THE INVENTION

1. Field of the Invention

The present invention relates generally to activity centers having toys for children, and specifically to an activity belt to be worn by a cyclist, having activities to amuse a child.

2. Description of Related Art

Bicycling together is a popular activity for active families. Families, with children too young to pedal, often use a child carrier seat. Typically such child carrier seats attach to an adult bicycle behind the adult's bicycle seat, over the rear wheel. The child is generally strapped into the seat with a harness. This arrangement provides excellent exercise for the adult.

Many adults crave time outdoors as a change of pace from the office. Children, on the other hand, generally have many opportunities to play outside. The natural scenery of trees, grass, birds, and the like can seem dull to children, particularly after a long ride. Small babies often have little interest in anything more than that a few feet away, so they are not much amused by the passing scenery. A child who feels bored can easily make the entire family miserable, leading to cutting a ride short. A child's crying or tantrums can be a serious obstacle for a parent attempting to commute or run errands by bicycle.

For a family with a busy schedule, twilight or night may be the only practical time for bicycling together. Unfortunately, bicycling at night is dangerous, due to the difficulty automobile drivers have in seeing bicyclists. In addition, bicycling at night can be particularly dull for some children.

Many cyclists, including bicyclists and motorcyclists, find that having back support while cycling makes them more comfortable. For bicyclists, in particular, the typical bent-over pedaling position can be uncomfortable for the back. Back support while bicycling helps to prevent and/or relieve back pain and improves performance. Belts are known for providing back support to prevent back pain due to heavy lifting. Belts are also known for providing back support while cycling.

Carrying essential items such as keys, identification, and money can be difficult while cycling. Carrying a conventional purse or wallet while bicycling is often impractical. Purses tend to be awkward and interfere with operation of the bicycle. Many cycling clothes do not have pockets, so that finding a place for keys or a wallet is difficult. Even where a pocket is available, items may fall out and be lost while the cyclist is distracted by the requirements of operating the cycle. In addition, carrying a wallet or keys in a back pocket while cycling is uncomfortable.

Fanny packs are available for carrying small items while cycling. Fanny packs do not provide amusement for a child riding behind the cyclist. They also do not provide back support.

Activity centers having a variety of amusement devices or toys for amusing a child are well known. Some activity centers are designed to attach to an object, such as the side of a crib. Such activity centers are not designed to attach to a person and are not suitable for use while bicycling. Typical activity centers are designed for indoor use. They do not include amusement devices which respond to the wind created by the motion of a cycle.

U.S. Pat. No. 4,540,219 issued on Sep. 10, 1985 to Klinger discloses a fabric cover for the shield of a child's safety seat, having toys attached. The cover is wrapped around the shield and secured in place with hook and loop fastener. Although the invention of Klinger has toys attached, some of which are removably attached, it lacks the utility of the current invention in that the current invention can be worn by a bicyclist having the dual utility of amusing a bored child and supporting the bicyclists back. The invention of Klinger also lacks any pockets or storage areas.

U.S. Pat. No. 5,465,888 issued on Nov. 14, 1995 to Owens describes a cycling belt which is worn by a bicyclist. The belt has an expandable pouch and pockets for holding child play and care items, including bottles and diapers. D-rings and tethers are provided for removably fastening child play and care items to the belt. The invention of Owens is not an activity center and does not provide support for the bicyclist's back as does the current invention.

U.S. Pat. No. 5,730,340 issued on Mar. 24, 1998 to Bosic shows a child's fanny pack having a retaining strap for holding a toy. The child's fanny pack of Bosic does not have attached toys and amusement devices like an activity center. It was not designed to be worn by an adult, with back support capabilities, for the amusement of a small child riding behind someone on a cycle.

None of the above inventions and patents, taken either singly or in combination, is seen to describe the instant invention as claimed.

SUMMARY OF THE INVENTION

The present invention is an activity belt to be worn by a cyclist, having amusement devices attached to amuse a child riding in a child carrier seat behind the cyclist. The activity belt of the current invention has the added utility of providing support for the back of a bicyclist. Also, the current invention has the additional capacity of pockets to carry keys or other necessities.

Accordingly, it is a principal object of the invention to provide an activity belt to be worn by a cyclist, having amusement devices attached to amuse a child riding behind the cyclist and to provide an activity belt which prevents boredom and tantrums by children accompanying their caregivers while cycling.

It is another object of the invention to provide an activity belt which has the additional advantage of supporting the cyclist's back, making bicycling more comfortable, and helping to prevent and/or relieve back pain.

It is another object of the invention to provide an activity belt which provides a pocket for comfortably and securely storing small items while cycling.

It is a further object of the invention to provide an activity belt having amusement devices which respond to the air flow created by the motion of the cycle, having clips to which a variety of amusement devices may be attached, and having reflective and/or glow-in-the-dark areas to enhance visibility at night, both to automobile drivers and to a child riding behind the cyclist.

It is an object of the invention to provide improved elements and arrangements thereof in an apparatus for the purposes described which is inexpensive, dependable and fully effective in accomplishing its intended purposes.

BRIEF DESCRIPTION OF THE DRAWINGS

FIG. 3 is a top plan view of the exterior surface of another embodiment of the activity belt.

FIG. 4 is a top plan view of the exterior surface of another embodiment of the activity belt.

FIG. 6 is a cross sectional view of the activity belt of FIG. 4.

FIG. 7 is a cross sectional view of the activity belt of FIG. 3.

Similar reference characters denote corresponding features consistently throughout the attached drawings.

DETAILED DESCRIPTION OF THE PREFERRED EMBODIMENTS

Figure 1:
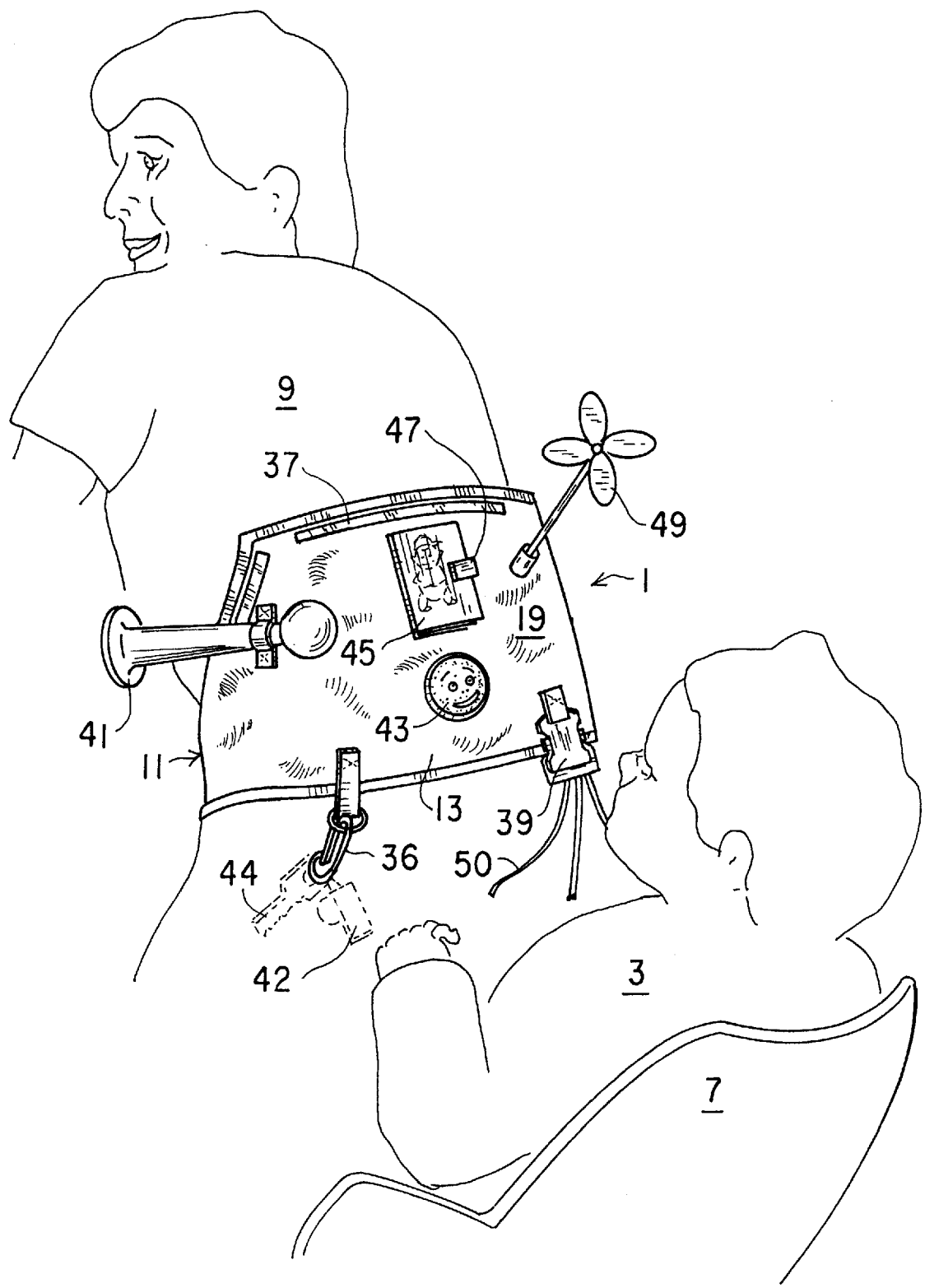
FIG. 1 is an environmental, perspective view of a cycling activity belt in use.

The present invention, as shown in FIG. 1, is an activity belt 1 for amusing a child 3 riding in a child carrier seat 7 behind a cyclist 9. The cyclist 9 has a back and a waist. The back of the cyclist 9 has a length from approximately the neck to the buttocks or seat. The activity belt 1 may be used by either male or female cyclists.

The child carrier seat 7 is preferably of a type which places the child 3 close enough to touch the back of the cyclist, while allowing the child 3 room to move. Such child carrier seats are commonly used with bicycles, and may be used with other types of cycles, such as motorcycles and mopeds. Preferably the cyclist 9 is a bicyclist, and the child carrier seat 7 attaches to the bicycle behind the cyclist's bicycle seat, over the rear wheel. This arrangement places the activity belt 1 within a short distance of the child 3.

Figure 2:
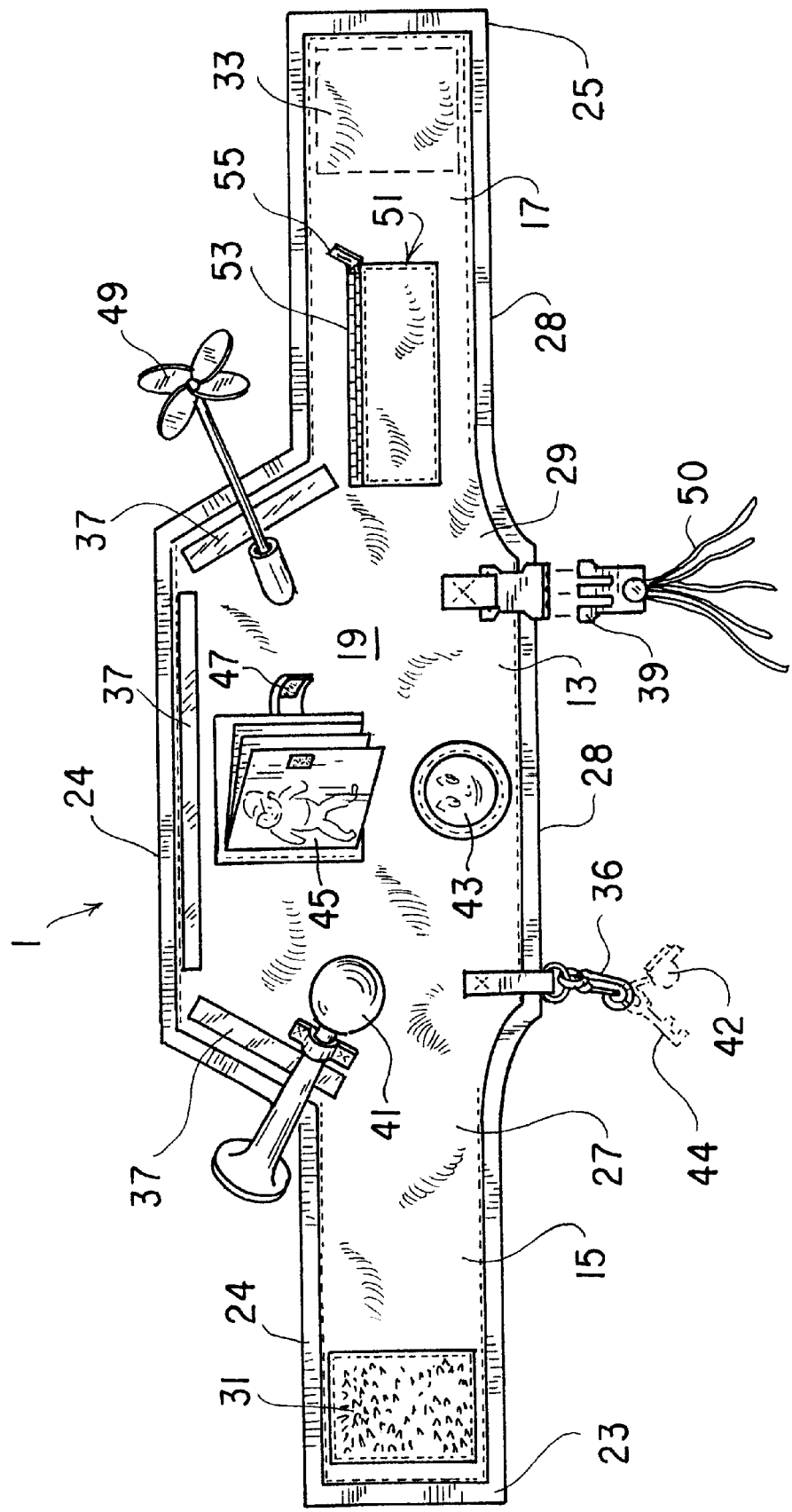
FIG. 2 is a top plan view of the exterior surface of the activity belt of FIG. 1.

The activity belt 1 includes a belt portion 11 having a back section 13, a first side section 15, and a second side section 17, as shown in FIG. 2. The belt portion 11 has an exterior surface 19, an opposing interior surface 21, a first terminal aspect 23, and a second terminal aspect 25. The back section 13 has a first end 27 and a second end 29. The first and second side sections 15 and 17 are attached to the first and second ends 27 and 29 of the back section 13 respectively. The first side section 15 may extend to either the left or the right of the back section 13, with the second side section 17 extending from the opposite side in either case. The first and second side sections 15 and 17 have the first and second terminal aspects 23 and 25 opposite the back section 13, as shown in FIGS. 2, 3, 4 and 5.

The belt portion 11 may be composed of a variety of materials. Fabric may be used either for the entire belt portion 11 or for the interior and/or exterior surfaces 21 and 19. The belt portion 11 may be stuffed with cotton or with polyester batting between the interior and exterior surfaces 21 and 19. FIG. 7 shows a sectional view of the belt portion 11 of the embodiment depicted in FIG. 3. The sectional view of the activity belt 1 shows the batting 72 where the interior surface 21 is made of a first layer of fabric 71, and the exterior surface 19 is made of a second layer of fabric 74.

Bias binding 73 surrounds the outer edges, the top edge 24 and the bottom edge 28, of the entire activity belt 1 in the embodiment of FIG. 3. The bias binding 73 is placed around the edges and sewn onto the activity belt 1 such that each stitch 75 goes through the first layer of fabric 71, the second layer of fabric 74 and the batting 72 as well as the bias binding 73 as shown in FIG. 7. The bias binding 73 may be made of an elastic material as needed. Preferably the back section 13 and the side sections 15 and 17 are composed at least partially of an expanded synthetic resin material or synthetic foam. A synthetic rubber such as neoprene is acceptable. These materials are flexible, durable, inexpensive, and comfortable.

FIG. 6 shows a sectional view of the belt portion 11 of the embodiment depicted in FIG. 4. The embodiment of FIG. 4 contains two layers of material. The interior surface 21 is the side of a layer of expandable synthetic material 82 composed of synthetic resin material, foam or rubber, and the exterior surface 19 is a layer of flexible fabric 81. The two layers are bound together by some adhesive means 84, and buttonhole stitches 83 are used to hold the edges together. Ideally, the material is sufficiently rigid so that the back section 13 remains flat against the back of the cyclist 9. Most preferably the material has at least some elasticity, particularly in the direction of the length of the belt portion 11. This allows the belt portion 11 to stretch to fit the cyclist 9.

The belt portion 11 is preferably machine washable, so that cleaning is easy. The exterior surface 19 of the belt portion 11 may be brightly colored and/or has an appealing child-oriented design such as a clown, sun, or other visage. The exterior surface 19 of the back section 13 may include a variety of textures or designs, such as letters 59 and/or numbers 60, as shown in FIG. 4, to interest the child 3. Additionally, the exterior surface 19 of the back section 13 may include an appealing child-oriented design such as a clown, sun, or other visage.

In a favored embodiment the side sections 15 and 17 are integrally attached to the back section 13, as shown in FIGS. 1, 2, 3, 4 and 5. A suitable thickness for the back and side sections is about ⅜ inch to ½ inch, most preferably ⅜ inch.

Each of the sections 13, 15 and 17 has a width. The width of the back section 13 is generally greater than the width of the side sections 15 and 17. The maximum width of the back section 13 is preferably about twice the width of the side sections 15 and 17. An acceptable width, for each of the side sections 15 and 17, is about 5 inches.

The back section 13 is adapted to support the back of the cyclist 9. Ideally, the back section 13 is ergonomically shaped and adapted to support the back while bicycling. Preferably the maximum width of the back section 13 ranges from about ¼ to about ½ of the length of the back of the cyclist 9. Most preferably the maximum width of the back section 13 is about ⅓ of the length of the cyclist's back. This width allows for comfortable back support and space for amusement devices without being overly bulky or overheating the cyclist 9. A suitable width of the back section 13 is about 9 inches.

Each of the back and side sections 13, 15, and 17 has a top edge 24 and a bottom edge 28. Preferably the width of the back section 13 increases gradually starting from the first and second ends 27 and 29 of the back section 13 and reaches its maximum at about two inches from the first and second ends 27 and 29 of the back section. At the maximum width the top edge 24 of the back section 13 preferably extends about 3 inches beyond the top edge 24 of the side sections 15 and 17. Similarly, at the maximum width the bottom edge 28 of the back section 13 preferably extends about 1 inch beyond the bottom edge 28 of the side sections 15 and 17. This arrangement provides for excellent back support and comfort.

The back support provided by the activity belt 1 makes cycling more comfortable. Back pain is prevented. Bicyclists who are parents of small children find back support especially helpful, since parenting involves frequent lifting. For a parent already experiencing back pain, cycling may be impractical without back support.

The belt portion 11 and each of the back 13 and side sections 15 and 17 has a length. The length of the belt portion 11 extends from the first terminal aspect 23 to the second terminal aspect 25. The length of the belt portion 11 is appropriate to fit the waists of typical cyclists. Suitable lengths are about 12 inches for each of the side sections 15 and 17, and about 17 inches for the back section 13.

Figure 5:
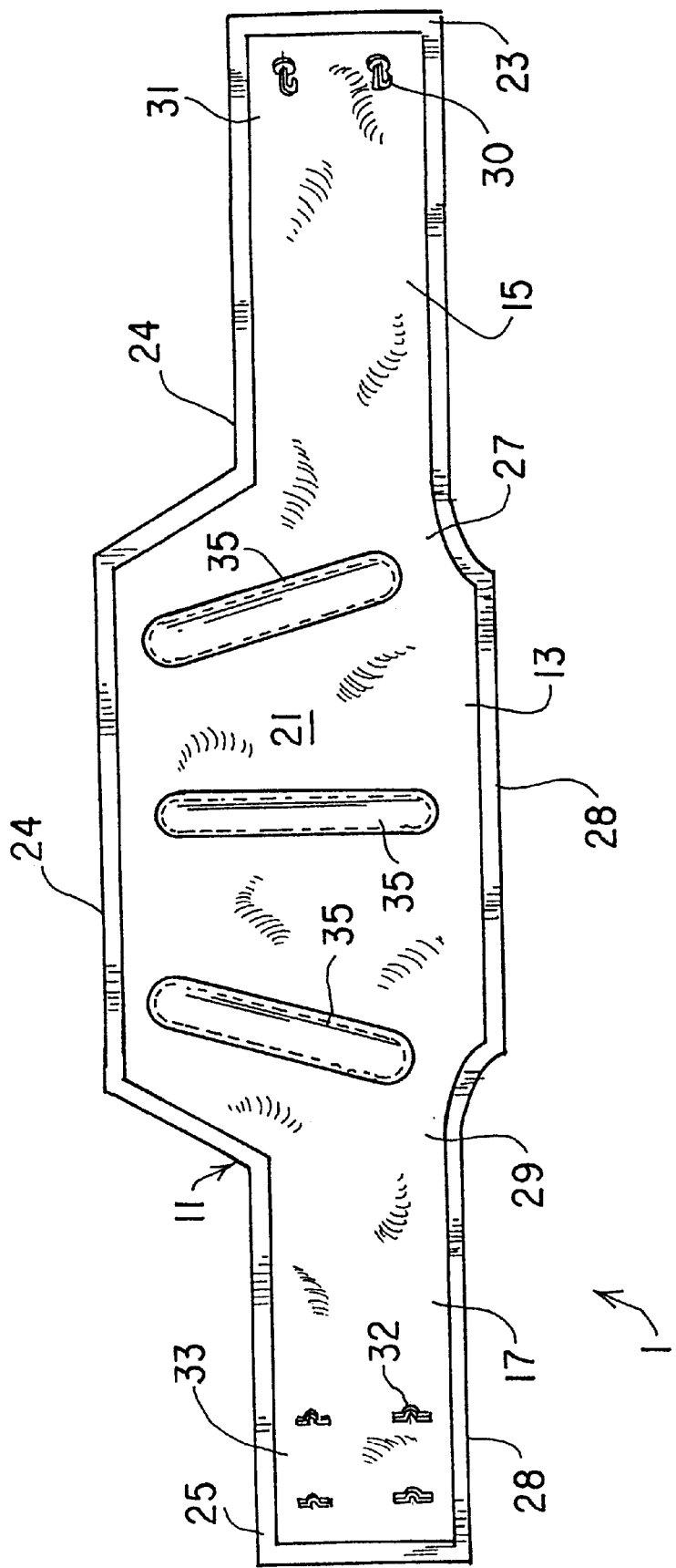
FIG. 5 is a top plan view of the interior surface of an alternative embodiment of the activity belt.

The back section 13 may include one or more stiffeners 35, as shown in FIG. 5. The stiffeners 35 preferably extend generally parallel to the width of the belt portion 11. The stiffeners 35 may be located at a slight angle relative to the width of the belt portion 11, as shown in FIG. 5. The stiffeners 35 are preferably attached to the interior surface 21 of the back section 13. The stiffeners 35 may be of leather or other suitable materials. The stiffeners 35 may incorporate a lightweight core of metal, such as aluminum. The stiffeners 35 serve to stabilize the back section 13, keeping it flat against the back of the cyclist 9, even when the child 3 pulls on it. The stiffeners 35 also provide additional back support for the cyclist 9.

The activity belt 1 has a waist fastener composed of mating first and second fastener portions 31 and 33. The first and second fastener portions 31 and 33 are attached to the first and second terminal aspects 23 and 25 of the belt portion 11 respectively. Preferably the first fastener portion 31 is attached to the exterior surface 19 of the first side section 15, and the second fastener portion 33 is attached to the interior surface 21 of the second side section 17 adjacent to the first and second terminal aspects 23 and 25 of the belt portion 11 respectively, as shown if FIGS. 2 and 4.

The waist fastener releasably secures the belt portion 11 around the waist of the cyclist 9. The first and second fastener portions 31 and 33 mate together to releasably attach the first and second terminal aspects 23 and 25 of the belt portion 11 to form a continuous loop. The loop has a circumference. Preferably the circumference of the loop is approximately twice the length of the back section 13.

The activity belt 1 includes a length adjusting means for adjusting the circumference of the loop to fit the waist of the cyclist 9. The length adjusting means may be the waist fastener. In a preferred embodiment, one or more of the back and side sections include an elastic material. The elastic material adjusts the circumference of the loop by stretching to fit the waist. For example, each of the side sections 15 and 17 may include an elastic section. Alternatively, the material composing the back and side sections 13, 15 and 17 may be elastic and stretch to fit the cyclist. A suitable elastic material is available under the trade name Lycra.

Preferably the waist fastener is composed of a hook and loop fastener, a clip fastener, or a hook and eye fastener. Most preferably the waist fastener is a hook and loop fastener, as shown in FIG. 2. In this case, one of the fastener portions 31 or 33 is the hook portion, while the other is the loop portion. Preferably each fastener portion of hook and loop fastener is generally rectangular and about 5 inches long, and about 4 inches wide. Individual strips of a hook and loop fastener may be used. A hook and loop fastener is easy to attach and detach, yet very secure in use. A hook and loop fastener can be attached at any point, so that length adjustment over a wide range of sizes to fit the cyclist's waist is easy.

The waist fastener may be a series of hook and eye fasteners, as shown in FIG. 5. The first fastener portion 31 (shown in phantom) has the hooks 30. The second fastener portion 33 includes the eyes 32. Several rows of eyes 32 may be used as the length adjusting means, as shown in FIG. 5.

Clip fasteners may be used for the waist fasteners. For example, one or more parachute clips 39 may be used. Length adjustment is provided in a typical manner by adjusting the length of the straps attached to the clips.

The activity belt 1 has at least two amusement devices attached to the exterior surface 19 of the back section 13. Preferably five or more amusement devices are present. The amusement devices are adapted to amuse the child 3.

The amusement devices may be attached in a variety of ways. An amusement device may be directly sewed or otherwise affixed to the back section 13. If the amusement device has an aperture suitable for hanging, the amusement device may be attached to a strap 34 sewn to the back section 13. Elastic straps or sturdy elastic string 26 may be used to provide bounce for additional amusement. Preferably all straps have a length of six inches or less, to avoid risk of strangulation to the child.

Preferably at least one of the amusement devices is releasably attached to the back section 13 by a fastening device. The fastening device may be a clip or any other fastener which cannot be easily opened by a small child. Child proofing is important to prevent the amusement devices from falling to the ground during a ride and being lost. Suitable clips include a plastic or metal clasp 36 or a plastic parachute clip 39. The clips may be attached to a strap hanging from the back section 13, as shown in FIG. 2. Alternatively, a strap having a loop secured by snaps may be used for attachment if the design is childproof. A hook and loop fastener may be used for attaching amusement devices for younger babies, but generally is not sufficiently childproof for toddlers.

Having the amusement devices releasably attached allows for a variety of toys to be used with the activity belt 1. The toys may be selected by a caregiver according to the age and interests of the child 3. The amusement devices may be changed at will to avoid boredom of the child.

A wide variety of amusement devices are suitable for the activity belt. Preferably the amusement devices move, rotate, and/or make a sound to hold the child's attention over a long period. Examples include electronic devices, a clicking steering wheel, a horn 41, a whistle 42, a bell 48, a rattle 44, teething rings 58, a squeaker or music maker 43, a noise maker 61, a string of beads 52, a zipper 40, and other amusement devices. The electronic devices could be any number of electronic toys such as calculators, electronic games or electronic noise/music makers. Another example of an amusement device is a push button music box enclosed in a miniature cloth pillow 46 in which the pillow has a whimsical shape such as a moon, star or sun. The amusement devices may also have interesting textures, such as a squishy gel for the child to touch. The amusement devices are preferably either removable or machine washable.

The amusement devices on the activity belt 1 are located close enough to the child 3 to provide plentiful entertainment. This keeps the child occupied, even on long rides. The cyclist 9 has no need to cut a ride short because the child 3 has become bored and restless. Exercising together is easier and more enjoyable. The activity belt 1 makes commuting or running errands by bicycle less of a hassle.

In a preferred embodiment, at least one of the amusement devices is an air-actuated device. The air-actuated device responds to air flow created by motion of the cycle. For example, the air-actuated device may respond to air flow by rotating, as with a pinwheel or propeller 49. The air-actuated device may be a streamer 50 which flutters in the wind as the cycle moves forward. Other possibilities include whistles or wind chimes which produce a sound in response to air flow. Preferably any air-actuated device is located near the first or second ends 27 or 29 of the back section 13, as shown in FIGS. 1 and 2, to receive the maximum air flow whenever the cycle moves. Air-actuated devices are fascinating for all children, but are particularly helpful with young babies. Young babies have short arms and may be unable to reach some of the amusement devices, or may lack the coordination to make a toy move. Air-actuated devices provide a means for entertainment which is not dependent on the child's actions.

A book 45 having fabric or plastic pages may be provided as an amusement device. Preferably the book 45 has at least three pages and a closure device 47 for holding the pages closed as desired. The book 45 may be permanently attached to the back section 13 by stitching, as shown in FIG. 2. The closure device 47 may be composed of hook and loop fastener, as shown in FIGS. 1, 2 and 3. The pages of the book 45 may include a variety of activities suitable for children, such as lifting a flap, zipping a zipper, buttoning a button, turning clock hands, or threading a string through a hole.

A mirror 54 having an unbreakable surface may be provided as an amusement device. Small children and especially infants are fascinated by mirrors. They enjoy looking at their reflection endlessly. The mirror 54 may be provided with a cover 56 and a designer closure device 57, as shown in FIG. 4. The cover 56 may be made of cloth, plastic or other flexible material. The mirror 54 may be permanently attached to the back section 13 by stitching. The designer closure device 57 may be composed of hook and loop fastener.

The exterior surface 19 of the belt portion 11 may include one or more reflective areas 37. The reflective areas 37 are adapted to reflect light to improve visibility of the cyclist 9 at night. The reflective areas 37 may be reflective strips, as shown in FIG. 2. Reflective piping may be used on the top and bottom edges 24 and 28 of the belt portion 11. If desired, the entire exterior surface of the belt portion 11 may be constructed of reflective materials. Conventional reflectors 38 may be utilized as shown in FIG. 3.

The reflective areas 37 may also be amusement devices. Small children find lights fascinating, and the changing light patterns provided by reflectors are particularly entertaining. The reflective areas 37 make cycling with a child at night both safer and more enjoyable. Cycling at night increases opportunities for exercise during a typical work week for a parent, as well as providing an activity for parent and child to enjoy together frequently.

To further improve night visibility, one or more of the amusement devices may be adapted to produce light in the visible wavelengths. For example, a small flashlight may be attached to the back section 13 for the child to manipulate. Various colored lights may be provided which wink on and off, either in a preset pattern or in response to the child's motions. The lights may be linked to a photocell so they come on automatically after dark. This allows the cyclist 9 to turn on the lights before riding and avoid having to fumble for a switch during a ride. Alternatively, light in the visible wavelengths may be produced by amusement devices composed of fluorescent or glow-in-the-dark materials.

The activity belt 1 may include a pocket 51. The pocket 51 is preferably attached to the exterior surface 19 of one of the side sections 15 or 17. This location puts the pocket 51 out of reach of the child 3 but within easy reach of the cyclist 9. The pocket has an opening 53 and a closure 55. The opening 53 provides access to the interior of the pocket 51. The closure 55 releasably secures the opening 53 so that the contents of the pocket cannot fall out. The pocket 51 comfortably holds keys, and other small items, without any interference with the cyclist's motions. The pocket 51 may be large enough to hold a wallet, if desired.

Preferably the closure 55 is a slide fastener or zipper, as shown in FIG. 2. The slide fastener 55 preferably closes from the back towards the front of the cyclist 9, so that when the pocket is closed the slide fastener 55 cannot be operated by the child 3. Also, the pocket may have an additional opening behind the pocket having the closure 55 where paper 61, money or other fairly flat objects can be slid between the exterior surface 19 and the pocket 51 as shown in FIG. 3.

When not cycling, the activity belt 1 may be used in the manner of a conventional activity center to amuse a child. The activity belt may simply be laid on the floor for the child to play with. Alternatively, the activity belt may be used to keep a child occupied in any situation which requires a parent to be seated with his back to the child for an extended period. For example, the activity belt may be worn by a parent while working at a computer. The activity belt can also be worn when not cycling to prevent back pain or provide back support.

It is to be understood that the present invention is not limited to the sole embodiments described above, but encompasses any and all embodiments within the scope of the following claims.

I claim:

1. An activity belt for amusing a child riding in a child-carrier seat behind a cyclist, the cyclist having a back and a waist, the back having a length, the activity belt comprising:

(a) a belt portion having a back support section, a first side section, a second side section, an exterior surface, an opposing interior surface, a first terminal aspect, and a second terminal aspect, the back support section having a first end and a second end, the first and the second side sections being attached to the first and the second ends of the back support section respectively, each of the sections having a width, the width of the back support section being generally greater than the width of the side sections, the first and second terminal aspects being attached to the first and second side sections opposite the back support section respectively, the width of the back support section being from about seven inches to about twelve inches;

(b) a waist fastener composed of mating first and second fastener portions, the first and second fastener portions being attached to the first and second terminal aspects of the belt portion respectively, the first and second fastener portions mating to releasably attach the first and second terminal aspects of the belt portion to form a continuous loop, the loop having a circumference, so that the belt portion is releasably secured around the waist of the cyclist;

(c) a length adjusting means for adjusting the circumference of the loop to fit the waist of the cyclist;

(d) means for stabilizing the back support section of the activity belt to keep it flat against the back of the cyclist and for providing additional support for the cyclist comprising at least one stiffener disposed in said back support section, said at least one stiffener extending generally parallel to the width of the back support section;

(e) at least one light reflective area disposed on the exterior surface of the belt portion; and (f) at least two amusement devices removably attached to the exterior surface of the back support section, said at least two amusement devices taken from the group consisting of a clicking steering wheel, a horn, a whistle, a bell, a rattle, a teething ring, a squeaker, a music maker, a noise maker, a string of beads, a zipper, a push button music box enclosed in a miniature pillow, a book, a mirror, an electronic device, an air-actuated device and a reflector.

2. The activity belt according to claim 1, wherein the back support section is adapted to support the back, the first fastener portion is attached to the exterior surface of the first side section adjacent to the first terminal aspect, and the second fastener portion is attached to the interior surface of the second side section adjacent to the second terminal aspect.

3. The activity belt according to claim 2, wherein the side sections are integrally attached to the back support section.

4. The activity belt according to claim 2, wherein the back support section and the side sections are composed of an expanded synthetic resin material.

5. The activity belt according to claim 2, wherein the circumference of the loop is approximately twice the length of the back support section.

6. The activity belt according to claim 2, wherein the width of the back support section ranges from about ¼ to about ½ of the length of the back.

7. The activity belt according to claim 2, wherein at least one of the amusement devices is a book, the book having at least three pages and a closure device, the closure device being composed of hook and loop fastener.

8. The activity belt according to claim 2, wherein the waist fastener is selected from the group consisting of hook and loop fastener, clip fastener, and hook and eye fastener.

9. The activity belt according to claim 2, wherein the back support section and the side sections are composed of the elastic material.

10. The activity belt according to claim 2, further comprising a pocket, the pocket being attached to the exterior surface of one of the side sections, the pocket having an opening and a closure, the closure releasably securing the opening.

* * * * *